US009253401B2

United States Patent
Ikeda et al.

(10) Patent No.: US 9,253,401 B2
(45) Date of Patent: Feb. 2, 2016

(54) IMAGING DEVICE AND IMAGING METHOD WHERE SHAKE ADJUSTED IMAGE IS DIVIDED INTO REGIONS FOR PARALLEL PROCESSING

(71) Applicant: OLYMPUS CORPORATION, Tokyo (JP)

(72) Inventors: Hideru Ikeda, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 83 days.

(21) Appl. No.: 14/132,573

(22) Filed: Dec. 18, 2013

(65) Prior Publication Data

US 2014/0176737 A1   Jun. 26, 2014

(30) Foreign Application Priority Data

Dec. 20, 2012   (JP) ................................. 2012-278484

(51) Int. Cl.
    *H04N 5/232* (2006.01)
(52) U.S. Cl.
    CPC ....... *H04N 5/23267* (2013.01); *H04N 5/23251* (2013.01); *H04N 5/23254* (2013.01)

(58) Field of Classification Search
    None
    See application file for complete search history.

(56) References Cited

U.S. PATENT DOCUMENTS

| | | | | |
|---|---|---|---|---|
| 2004/0189819 | A1* | 9/2004 | Saito | 348/222.1 |
| 2007/0236578 | A1* | 10/2007 | Nagaraj et al. | 348/208.99 |
| 2011/0234824 | A1* | 9/2011 | Ogasahara | 348/208.4 |
| 2012/0154634 | A1* | 6/2012 | Sugimura | 348/231.99 |

FOREIGN PATENT DOCUMENTS

JP      2004-289631 A     10/2004

* cited by examiner

*Primary Examiner* — Shahbaz Nazrul
(74) *Attorney, Agent, or Firm* — Westerman, Hattori, Daniels & Adrian, LLP

(57) ABSTRACT

An imaging device includes an imaging processing unit that includes a solid-state imaging device outputting a pixel signal according to incident subject light and outputs a captured image according to the pixel signal output by the solid-state imaging device, image processing circuits that generate a photography image by performing image processing on a corresponding region within a processed region cut out from the captured image output from the imaging processing unit, and a division position determination unit that detects movement of a photography position at which the solid-state imaging device photographs a subject within a captured region of the solid-state imaging device.

6 Claims, 7 Drawing Sheets

(CAPTURED IMAGE)

(PHOTOGRAPHY IMAGE)

(IMAGED REGION)

(IMAGED REGION)

PRIOR ART

CAMERA-SHAKE OCCURS IN DIRECTION OF ↙

CAMERA-SHAKE OCCURS IN DIRECTION OF ↗

PRIOR ART

IMAGING DEVICE AND IMAGING METHOD WHERE SHAKE ADJUSTED IMAGE IS DIVIDED INTO REGIONS FOR PARALLEL PROCESSING

BACKGROUND OF THE INVENTION

1. Field of the Invention

The present invention relates to an imaging device and an imaging method.

Priority is claimed on Japanese Patent Application No. 2012-278484, filed Dec. 20, 2012, the content of which is incorporated herein by reference.

2. Description of Related Art

In recent years, with increases in resolution and performance of imaging devices such as digital still cameras or video cameras, more complicated image processing at a higher speed is required at the time of photography. For this reason, for example, Japanese Unexamined Patent Application, First Publication No. 2004-289631 discloses a technology for performing image processing at a high speed. According to the technology disclosed in Japanese Unexamined Patent Application, First Publication No. 2004-289631, a region (hereinafter referred to as an "imaged region") imaged by a solid-state imaging device included in an imaging device is divided into a plurality of regions and a plurality of image processing circuits corresponding to the divided regions perform image processing in parallel, so that a processing time of the image processing necessary to generate one photographed image can be shortened.

FIGS. 6A, 6B, and 6C are diagrams illustrating an example of a method of shortening a time necessary for image processing in an imaging device according to the related art. FIGS. 6A, 6B, and 6C show a difference in the processing time necessary for the image processing performed by the imaging device according to a difference in the number of image processing circuits included in the imaging device.

When the imaging device includes only one image processing circuit, as illustrated in FIG. 6A, the one image processing circuit performs image processing on the entire imaged region, that is, performs the image processing corresponding to the number of pixels included in the solid-state imaging device. On the other hand, when the imaging device includes two image processing circuits, as illustrated in FIG. 6B, the imaged region is divided into two equal regions (regions X and Y). Image processing circuits X and Y included in the imaging device may perform the image processing on the corresponding regions in parallel. That is, the image processing circuits X and Y each perform the imaging process on half of the number of pixels in the solid-state imaging device. Accordingly, as illustrated in FIG. 6C, it is possible to shorten the processing time necessary for the imaging device to perform image processing.

FIG. 6C shows an example in which the processing time in the case in which the one image processing circuit performs the image processing on the entire imaged region, as illustrated in FIG. 6A is compared to the processing time in the case in which the two image processing circuits X and Y perform the image processing on the divided imaged regions in parallel, as illustrated in FIG. 6B. As illustrated in FIG. 6C, the processing time necessary for the image processing is halved when the image processing circuits X and Y respectively perform the image processing on the regions, which are imaged regions X and Y equally divided from the imaged region, in parallel compared to the case in which one image processing circuit performs the image processing on the entire imaged region rather than dividing the imaged region. Accordingly, a throughput from imaging performed by the imaging device to completion of the image processing performed to generate one photographed image is doubled, and thus it is possible to realize a high speed imaging device.

Recent imaging devices are configured to have a photography assistance (supporting) function such as a camera-shake correction function. Therefore, recent imaging devices do not perform the image processing on the entire imaged region imaged by a solid-state imaging device, and generally perform image processing on a region partially cut from an imaged region in consideration of the fact that a position (hereinafter referred to as a "photography position") at which the solid-state imaging device images a subject is shaken in the imaged region due to camera shake.

FIGS. 7A, 7B, 7C, 7D, and 7E are diagrams illustrating an example of a relation between a change in a region caused due to camera shake in an imaging device according to the related art and a time necessary for image processing. When camera shake occurs in directions of arrows illustrated in FIGS. 7A and 7B at the time of photography by the imaging device, a partial region (hereinafter referred to as a "processed region") necessary to perform image processing in order to generate one photographed image is moved in an opposite direction to the direction in which the camera shake occurs, as in a processed region Z illustrated in FIGS. 7A and 7B. Since an amount or a direction of camera shake differs for each frame photographed by the imaging device, a cutout position of the processed region at which the image processing is performed also differs for each frame photographed by the imaging device.

For this reason, when camera shake occurs and an imaged region imaged by a solid-state imaging device is simply divided into two equal regions, as in Japanese Unexamined Patent Application, First Publication No. 2004-289631, the sizes (areas) of the processed regions Z included in the regions X and Y may not be equal, as illustrated in FIGS. 7C and 7D. Accordingly, allocation amounts of the image processing allocated to the image processing circuits X and Y may not be equal.

Further, when the allocation amounts of the image processing allocated to the image processing circuits X and Y are not equal, processing times of the image processing performed on the regions X and Y to which the image processing circuits X and Y correspond may differ from each other, as illustrated in FIG. 7E. FIG. 7E shows an example in which the processing time of the image processing circuit X is compared to the processing time of the image processing circuit Y when the image processing is allocated to the ranges of the processed regions Z of the image processing circuits X and Y, as illustrated in FIG. 7D.

When the processing times of the image processing circuits X and Y differ from each other, as illustrated in FIG. 7E, a time necessary until the image processing circuit X to which the greater allocation amount of the image processing is allocated completes the image processing, that is, the processing time of the image processing circuit X in the imaging device, may be a time necessary for image processing of one frame. From the viewpoint of the image processing on each frame, the frame rate, and accordingly the processing performance, of the imaging device may deteriorate.

SUMMARY OF THE INVENTION

According to a first aspect of the present invention, there is provided an imaging device including: an imaging processing unit that includes a solid-state imaging device outputting a pixel signal according to incident subject light and outputs a captured image according to the pixel signal output by the solid-state imaging device; image processing circuits that generate a photography image by performing image processing on a corresponding region within a processed region cut out from the captured image output from the imaging processing unit; and a division position determination unit that detects movement of a photography position at which the solid-state imaging device photographs a subject within a captured region of the solid-state imaging device, determines the processed region cut out from the captured image according to the photography position after the detected movement in order for the image processing circuits to generate the photography image, and divides the determined processed region into divided regions and allocates each of the divided regions to a respected one of the image processing circuits.

According to a second aspect of the present invention, in the imaging device according to the first aspect, the division position determination unit may determine a division position at which the processed region is divided so that processing amounts of the image processing performed by the image processing circuits are equal to each other and output division region information indicating each region in the processed region divided at the determined division position to each of the corresponding image processing circuits. Each of the image processing circuits may generate a photography image of the corresponding region by performing the image processing on the region within the processed region indicated by the corresponding division region information input from the division position determination unit.

According to a third aspect of the present invention, in the imaging device according to the second aspect, the division position determination unit may calculate a movement distance or a movement direction of the subject based on the subject contained in the captured image immediately previously output from the imaging processing unit and the subject contained in the current captured image and detect movement of the photography position based on a calculated movement amount of the subject.

According to a fourth aspect of the present invention, in the imaging device according to the second or third aspect, the division position determination unit may change the division position at which the processed region is divided so that the processing amounts of the image processing performed by the image processing circuits are equal to each other, including distortion of an optical system contained in the captured image at the time of photography.

According to a fifth aspect of the present invention, in the imaging device according to any one of the second to fourth aspects, the division position determination unit may change the division position at which the processed region is divided so that the processing amounts of the image processing performed by the image processing circuits are equal to each other, including distortion according to a posture of the imaging device at the time of photography of the subject.

According to a sixth aspect of the present invention, in the imaging device according to any one of the second to fifth aspects, the division position determination unit may detect movement of the photography position based on motion of the imaging device itself detected by a motion detection sensor detecting motion.

According to a seventh aspect of the present invention, there is provided an imaging method including: outputting a captured image according to a pixel signal output by a solid-state imaging device outputting the pixel signal according to incident subject light and; detecting movement of a photography position at which the solid-state imaging device photographs a subject within a captured region of the solid-state imaging device, determining the processed region cut out from the captured image according to the photography position after the detected movement in order for the plurality of image processing circuits to generate a photography image, and dividing the determined processed region into divided regions and allocating each of the divided regions to one of the plurality of image processing circuits; and generating the photography image subjected to the image processing by the plurality of corresponding image processing circuits with regard to each of the regions divided from the processed region cut out from the captured image output in the outputting of the captured image.

DETAILED DESCRIPTION OF THE INVENTION

Hereinafter, embodiments of the present invention will be described with reference to the drawings. In the following description, a case in which an imaging device includes two image processing circuits and takes a photograph of a moving object will be used as an exemplary example. The same applies when the imaging device photographs a still image.

Figure 1:
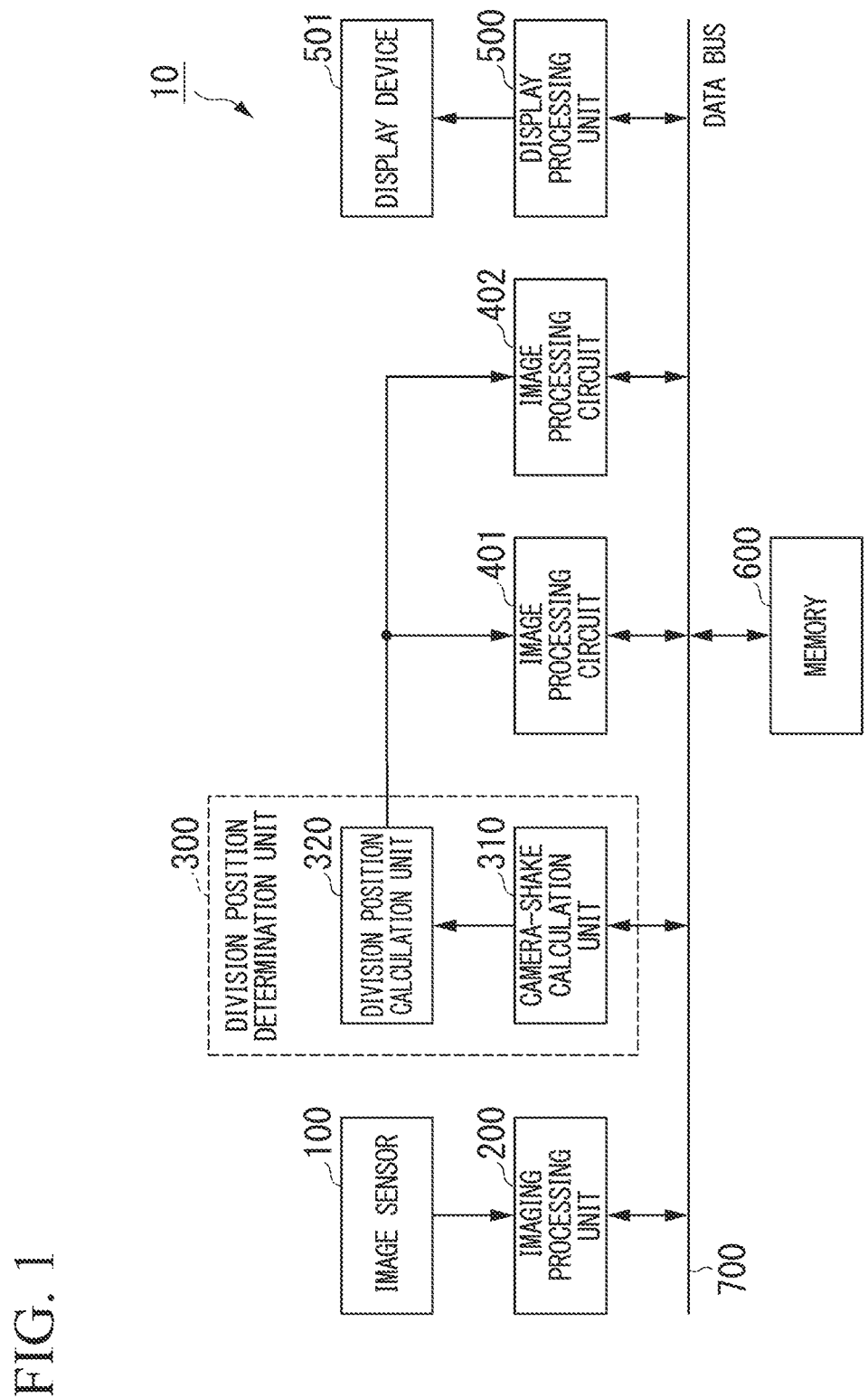
FIG. 1 is a block diagram illustrating a schematic configuration of an imaging device according to an embodiment of the present invention.

FIG. 1 is a block diagram illustrating a schematic configuration of the imaging device according to the embodiment. An imaging device 10 illustrated in FIG. 1 includes an image sensor 100, an imaging processing unit 200, a division position determination unit 300, two image processing circuits 401 and 402, a display processing unit 500, a display device 501, and a memory 600.

The imaging processing unit 200, the division position determination unit 300, the image processing circuits 401 and 402, the display processing unit 500, and the memory 600 in the imaging device 10 are connected via a data bus 700, and store (write) data in the memory 600 and acquire (read) data from the memory 600 by, for example, direct memory access (DMA) transmission.

The image sensor 100 is a solid-state imaging device typified by a charge coupled device (CCD) image sensor or a complementary metal-oxide semiconductor (CMOS) image sensor that electrically converts an optical image of a subject formed by a lens (not illustrated). The image sensor 100 outputs pixel signals according to subject light to the imaging processing unit 200. When the imaging device 10 photographs a moving image, the image sensor 100 sequentially outputs the pixel signals of respective frames according to the subject light to the imaging processing unit 200.

The imaging processing unit 200 performs various kinds of processing, such as analog/digital (A/D) conversion, pixel defect correction, shading correction, and dark-current correction, on the pixel signals input from the image sensor 100 and stores (writes) image data (hereinafter referred to as a "captured image") according to the pixel signal in the memory 600. When the imaging device 10 photographs a moving image, the imaging processing unit 200 sequentially performs various kinds of processing on the captured image of each frame according to the pixel signal of each frame input from the image sensor 100 and stores (writes) the processed image in the memory 600.

The division position determination unit 300 calculates a distance or a direction (hereinafter referred to as a "shake amount") in which a photography position is moved due to camera shake or the like occurring during photographing performed by the imaging device 10 and outputs information indicating a range of the captured image subjected to the image processing by each of the image processing circuits 401 and 402 to each of the image processing circuits 401 and 402. The division position determination unit 300 includes a shake-amount calculation unit 310 and a division position calculation unit 320.

The shake-amount calculation unit 310 calculates a shake amount of the photography position based on the captured image stored in the memory 600 by the imaging processing unit 200. For example, the shake-amount calculation unit 310 calculates the shake amount of the photography position based on a difference obtained by comparing the captured image of the current frame for which the shake amount of the photography position is calculated to the captured image of the immediately previous frame. More specifically, the shake-amount calculation unit 310 detects movement of the photography position by comparing the position and size, the color, or the like of a main subject or the like included in the captured image of the current frame to that included in the captured image of the immediately previous frame using, for example, block matching and calculates the shake amount based on the detected movement amount of the photography position. Then, the shake-amount calculation unit 310 outputs information regarding the calculated shake amount to the division position calculation unit 320.

A method of calculating the shake amount of the photography position in the shake-amount calculation unit 310 is not limited to the above-described method based on the captured images stored in the memory 600, that is, the method of comparing two captured images. Various other methods may be used as long as a movement distance or direction of the photography position of the imaging device can be detected. For example, information detected by a motion detection sensor, such as a gyro sensor, detecting a motion of the imaging device 10 itself based on an angle may be configured to be output as the shake amount of the photography position to the division position calculation unit 320.

Based on the shake amount of the photography position input from the shake-amount calculation unit 310, the division position calculation unit 320 cuts out a part from a captured image, that is, the entire captured image of the image sensor 100 and determines the cutout position and the size of a processed region subjected to image processing performed to generate a captured image of one frame. Then, based on the cutout position and the size of the determined processed region, the division position calculation unit 320 determines a division position to divide the processed region into two regions to be subjected to image processing in parallel by the image processing circuits 401 and 402. At this time, the division position calculation unit 320 determines a position at which processing amounts of the image processing performed by the image processing circuits 401 and 402 are equal, for example, the processed regions allocated to the image processing circuits 401 and 402 have equal sizes, as the division position at which the processed region is divided. Accordingly, the processing times of the image processing in the image processing circuits 401 and 402 are equal.

Based on information regarding the determined cutout position and the determined size of the processing region and information regarding the division position, the division position calculation unit 320 outputs information (hereinafter referred to as "divided-region information") regarding the regions to be subjected to the image processing by the image processing circuits 401 and 402 to the image processing circuits 401 and 402. The cutout position, the size, and the division position of the processed region determined by the division position calculation unit 320 will be described in detail later.

When the imaging device 10 photographs a moving image, the division position determination unit 300 sequentially performs calculation of the shake amount and the determination of the cutout position, the size, and the division position of the processed region for each frame input from the image sensor 100 and sequentially outputs the divided-region information for each frame to the image processing circuits 401 and 402.

The image processing circuits 401 and 402 each acquire (read) the captured image stored in the memory 600 and generate image data (hereinafter referred to as a "photography image") obtained by performing image processing, for example, a development process such as a three-plate process (for example, Bayer YC or RGB conversion or the like), a distortion correction process, or a resizing process or a high image quality process such as a noise reduction process, a filter process, or a contour emphasis process on the acquired captured image. At this time, the image processing circuits 401 and 402 each acquire (read) the captured image of the processed region indicated by the corresponding divided-region information input from the division position calculation unit 320 in the division position determination unit 300 among the captured images stored in the memory 600 and generate the photography image subjected to the image processing.

Then, the image processing circuits 401 and 402 store (write) the generated photography image in the memory 600 again. Since image processing performed by each of the image processing circuits 401 and 402 is the same as the process in an imaging device according to the related art except that a region to be subjected to the image processing is a region indicated by the division region information, a detailed description thereof will be omitted here.

When the imaging device 10 takes a photograph of a moving object, the image processing circuits 401 and 402 each sequentially perform the imaging process on the captured images of the corresponding processed region based on the division region information input in correspondence with each frame and sequentially store (write) the photography images after the image processing in the memory 600.

The display processing unit 500 acquires (reads) the photography image subjected to the image processing by each of the image processing circuits 401 and 402 and stored in the memory 600, performs display processing such as a resizing (reducing) process of resizing the acquired photography image to a size of an image displayable by the display device 501 or a superimposing process of superimposing data for on-screen display (OSD) display, and outputs the processed result to the display device 501.

When the imaging device 10 photographs a moving image, the display processing unit 500 sequentially acquires the photography images of the respective frames stored in the memory 600, performs the display processing on the acquired photography images, and sequentially outputs the processed photography images to the display device 501.

The display device 501 is a display device such as a thin film transistor (TFT)-liquid crystal display (LCD) or an organic electro-luminescence (EL) display and displays images according the photographed images after the display processing output from the display processing unit 500.

The display device 501 may be a display device such as an electronic viewfinder (EVF) or an external display such as a television. In FIG. 1, the display device 501 is also a constituent element of the imaging device 10. However, the display device 501 may be configured to be detachably mounted on the imaging device 10.

The memory 600 is a memory such as a dynamic random access memory (DRAM) accessed by each constituent element included in the imaging device 10. The memory 600 temporarily records various kinds of data in the processing procedure of each constituent element in the imaging device 10.

In FIG. 1, each constituent element in the imaging device 10 is configured to access the memory 600 via the data bus 700. However, for example, the access to the memory 600 may be configured to be controlled by a memory controller (not illustrated). In this case, when each constituent element in the imaging device 10 outputs a request for access to the memory 600, for example, by DMA transmission to the memory controller, the memory controller controls storing (writing) data in the connected memory 600 and acquiring (reading) data from the memory 600 in response to the request for the access to the memory 600 by the DMA transmission input from each constituent element.

For example, the photography image stored in the memory 600 by each of the image processing circuits 401 and 402 is acquired (read) by a recoding processing unit (not illustrated) and is recorded, for example, in a recording medium (not illustrated), such as an SD memory card or a CompactFlash (CF (registered trademark)), detachably mounted on the imaging device 10. At this time, for example, the photography image is subjected to image processing such as a JPEG compression process by one or both of the image processing circuits 401 and 402.

In the imaging device 10 having this configuration, the image processing circuits 401 and 402 perform the image processing on images of a subject photographed by the image sensor 100 in parallel in consideration of the fact that a photography position is moved due to camera shake or the like occurring during photographing performed by the imaging device 10. Each constituent element in the imaging device 10 is controlled by, for example, a control unit (not illustrated) such as a central processing unit (CPU).

Figure 2A:
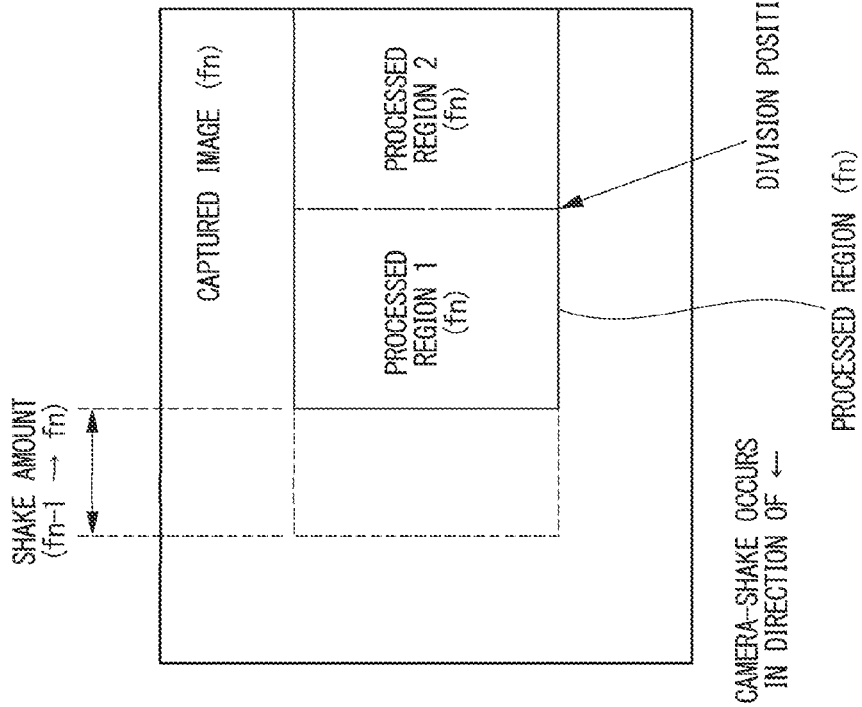
FIGS. 2A and 2B are diagrams schematically illustrating an example of a method of dividing a region to be subjected to the image processing by respective image processing circuits in the imaging device according to the embodiment.
Figure 2B:

Next, the cutout position, the size, and the division position of the processed region determined by the division position calculation unit 320 included in the division position determination unit 300 in the imaging device 10 will be described. FIGS. 2A and 2B are diagrams schematically illustrating an example of a method of dividing a region to be subjected to the image processing by respective image processing circuits in the imaging device 10 according to the embodiment. In the following description, to generate the entire imaged region of the image sensor 100, that is, a photography image of one frame from the captured image of the imaging device 10, image processing is performed by cutting out a partial processed region. In this case, a case in which the image processing circuits 401 and 402 included in the imaging device 10 perform the image processing on each processed region divided into two regions in the horizontal direction in parallel will be described. In the following description, to facilitate the description, a case in which camera shake or the like occurs in one direction will be described.

FIG. 2A is a diagram illustrating a relation between a captured image (fn−1) of an immediately previous frame and a processed region (fn−1) and the captured image (fn−1). The state illustrated in FIG. 2A show a relation between a captured image and a processed region at a reference position for which a photography position is not moved due to camera shake or the like. At this time, the shake-amount calculation unit 310 outputs shake amount information indicating that a photography position is not shaken to the division position calculation unit 320. The division position calculation unit 320 sets a middle portion of the captured image as the processed region (fn−1) of an fn−1 frame and outputs the division region information indicating that a position at which the processed region (fn−1) is divided into two equal regions in the horizontal direction is set as the division position (fn−1) to each of the image processing circuits 401 and 402. Accordingly, each of the image processing circuits 401 and 402 performs the image processing on the captured image in the corresponding processed region (fn−1) and the imaging device 10 generates a photography image fn−1 of the fn−1 frame corresponding to the processed region (fn−1). Here, for example, the image processing circuit 401 performs the image processing on the captured image in a processed region 1 (fn−1) illustrated in FIG. 2A and the image processing circuit 402 performs the image processing on the captured image in a processed region 2 (fn−1) illustrated in FIG. 2A, so that the photography image fn−1 is generated.

Thereafter, when the photography position is moved due to camera shake or the like occurring in the horizontal left direction, as indicated by an arrow illustrated in FIG. 2B in the captured image (fn) of a subsequent frame, a processed region (fn) is moved to the horizontal right direction opposite to the direction in which the camera shake occurs. At this time, the shake-amount calculation unit 310 outputs information of a shake amount (fn−1→fn) indicating that the photography position is shaken in the horizontal left direction to the division position calculation unit 320. The division position calculation unit 320 determines a region moved in the horizontal right direction from the processed region (fn−1) of the fn−1 frame according to the shake amount (fn−1→fn) as the processed region (fn) of an fn frame. Then, the division position calculation unit 320 determines a position at which the processed region (fn) is divided into two equal regions in the horizontal direction as the division position (fn), as illustrated in FIG. 2B, and outputs division region information based on information regarding the determined processed region (fn) and the determined division position (fn) to each of the image processing circuits 401 and 402. Accordingly, each of the image processing circuits 401 and 402 performs the image processing on the captured image in the corresponding processed region (fn) and the imaging device 10 generates a photography image fn of the fn frame corresponding to the processed region (fn). Here, for example, the image processing circuit 401 performs the image processing on the captured image in a processed region 1 (fn) illustrated in FIG. 2B and the image processing circuit 402 performs the image processing on the captured image in a processed region 2 (fn) illustrated in FIG. 2B, so that the photography image fn is generated.

Figure 3:
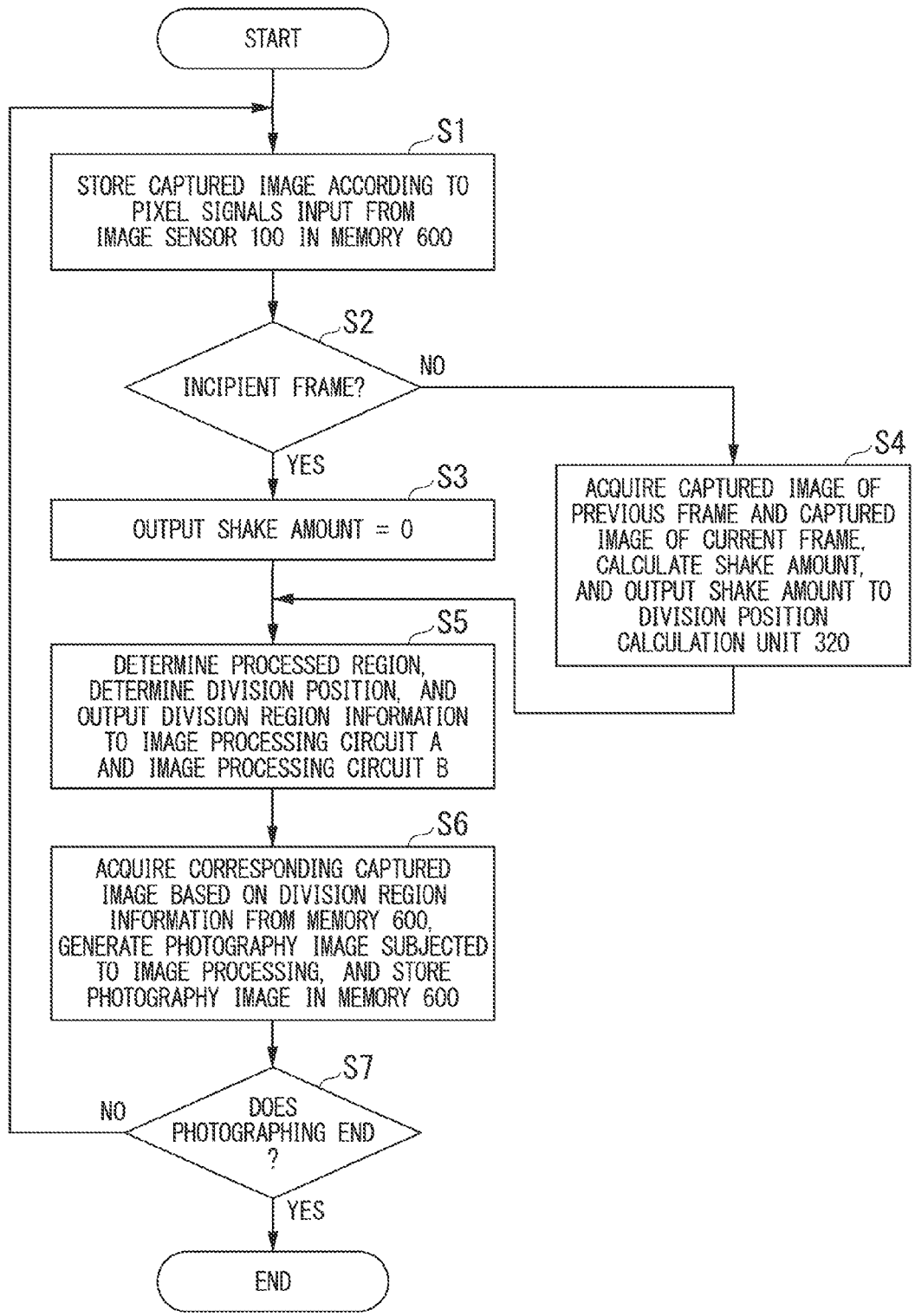
FIG. 3 is a flowchart illustrating a processing order of the image processing in the imaging device according to the embodiment.

Next, a processing order of the image processing in the imaging device 10 will be described. FIG. 3 is a flowchart illustrating the processing order of the image processing in the imaging device 10 according to the embodiment. FIG. 3 illustrates the processing order of the calculation of the shake amount by the division position determination unit 300, the determination of the cutout position, the size, and the division position of the processed region, and the image processing by the image processing circuits 401 and 402, when the imaging device 10 takes a photograph of a moving object.

In the following description, processes in a case in which the two image processing circuits 401 and 402 included in the imaging device 10 each perform the image processing on the processed region divided into two regions in the horizontal direction in parallel when the imaging device 10 photographs a moving image will be described in a processing order with reference to the example of the region dividing method of performing the image processing illustrated in FIGS. 2A and 2B. As described above, in the process in the imaging device 10, for example, each constituent element controlled by the control unit such as a CPU operates. Thus, the image processing is performed, but in the following description, a process of each constituent element in the imaging device 10 illustrated in FIG. 1 will be mainly described.

When a user (photographer) of the imaging device 10 gives an instruction to start photographing a moving image, the imaging device 10 starts the processing order of the image processing illustrated in FIG. 3. When the imaging device 10 starts photographing a moving image, the imaging processing unit 200 first stores (writes) the captured image (the captured image (fn−1) illustrated in FIGS. 2A and 2B) of the incipient frame obtained by performing various processes on the pixel signals input from the image sensor 100 in the memory 600 in step S1.

Subsequently, in step S2, the division position determination unit 300 determines whether the captured image stored in the memory 600 is the captured image of the incipient (first) frame. When it is determined that the captured image stored in the memory 600 is the captured image of the incipient frame in step S2 ("Yes" in step S2), the process proceeds to step S3. When it is determined that the captured image stored in the memory 600 is not the captured image of the incipient frame in step S2 ("No" in step S2), the process proceeds to step S4. Here, to store (write) the captured image (fn−1) of the incipient frame in the memory 600, the process proceeds to step S3.

When the captured image stored in the memory 600 is the captured image of the incipient frame in step S2, the shake-amount calculation unit 310 outputs information of a shake amount (for example, a shake amount=0) indicating that the photography position is not shaken to the division position calculation unit 320 in step S3.

Subsequently, in step S5, the division position calculation unit 320 determines a cutout position and a size of the processed region (fn−1) in which the image processing is performed to generate the photography image fn−1 of the incipient fn−1 frame based on the shake amount (=0) of the photography position input from the shake-amount calculation unit 310. Thereafter, the division position calculation unit 320 determines the division position (fn−1) at which the determined processed region (fn−1) is divided into two equal regions so that the image processing circuits 401 and 402 can each perform the image processing in parallel. Then, the division position calculation unit 320 outputs the division region information based on the information regarding the determined cutout position and the determined size of the processed region (fn−1) and the information regarding the division position (fn−1) to each of the image processing circuits 401 and 402.

Subsequently, in step S6, the image processing circuits 401 and 402 each acquire (read) the captured image of the processed region (fn−1) indicated by the corresponding division region information input from the division position determination unit 300 from the memory 600. Then, the image processing circuits 401 and 402 each store (write) the photography image generated by performing the image processing in parallel in the memory 600.

Subsequently, in step S7, it is determined whether the photographing of the moving image ends. More specifically, it is determined whether an instruction to end the photographing of the moving image is given from the user (photographer) of the imaging device 10. When it is determined that the photographing of the moving image ends in step S7 ("Yes" in step S7), the imaging device 10 ends the processing order of the image processing illustrated in FIG. 3. Conversely, when it is determined that the photograph of the moving object does not end in step S7 ("No" in step S7), the process returns to step S1 and the image processing starts for a subsequent frame.

In the image processing on the subsequent frame, in step S1, the imaging processing unit 200 stores (writes) the captured image (the captured image (fn) illustrated in FIGS. 2A and 2B) of the subsequent frame obtained by performing various processes on the pixel signals input from the image sensor 100 as the captured image (fn) of the current fn frame in the memory 600.

Subsequently, in step S2, the division position determination unit 300 determines whether the captured image stored in the memory 600 is the captured image of the incipient (first) frame. Here, to store (write) the captured image (fn) of the subsequent fn frame in the memory 600, the process proceeds to step S4.

When the captured image stored in the memory 600 is not the captured image of the incipient frame in step S2, the shake-amount calculation unit 310 acquires (reads) the captured image (fn−1) of the immediately previous frame and the captured image (fn) of the current fn frame from the memory 600 in step S4. Then, based on the acquired captured image (fn−1) and the captured image (fn), the shake-amount calculation unit 310 calculates the shake amount of the photography position and outputs information regarding the calculated shake amount to the division position calculation unit 320.

Subsequently, in step S5, the division position calculation unit 320 determines a cutout position and a size of the processed region (fn) in which the image processing is performed to generate the photography image fn of the current fn frame based on the shake amount of the photography position input from the shake-amount calculation unit 310. Thereafter, the division position calculation unit 320 determines the division position (fn) at which the determined processed region (fn) is divided into two equal regions so that the image processing circuits 401 and 402 can each perform the image processing in parallel. Then, the division position calculation unit 320 outputs the division region information based on the information regarding the determined cutout position and the determined size of the processed region (fn) and the information regarding the division position (fn) to each of the image processing circuits 401 and 402.

Subsequently, in step S6, the image processing circuits 401 and 402 each acquire (read) the captured image of the processed region (fn) indicated by the corresponding division region information input from the division position determination unit 300 from the memory 600. Then, the image processing circuits 401 and 402 each store (write) the photography image generated by performing the image processing in parallel in the memory 600.

Subsequently, in step S7, it is determined whether the photographing of the moving image ends. Thereafter, the processes of step S1 to step S7 are repeated until it is determined that the photographing of the moving image ends ("Yes" in step S7) in step S7.

Thus, in the imaging device 10 according to the embodiment, the shake-amount calculation unit 310 detects the movement of the photography position based on the captured image of the immediately previous frame and the captured image of the current frame. Then, the division position calculation unit 320 determines the cutout position and the size of the processed region based on the information regarding the shake amount of the photography position input from the shake-amount calculation unit 310 and determines the division position at which the determined processed region is divided so that the sizes of the processed regions allocated to the image processing circuits 401 and 402 are equal. Thus, as understood from FIGS. 2A and 2B, the processed region can normally be divided into two equal regions in the horizontal direction, irrespective of the position of the processed region. Accordingly, since the processing amounts of the image processing performed on the captured image within the corresponding processed region by the image processing circuits 401 and 402 are equal, the processing times of the image processing in the image processing circuits 401 and 402 can be set to be equal.

The shake-amount calculation unit 310 calculates the shake amount at each time of the photographing by the imaging device 10, that is, for each of the frames input from the image sensor 100, and sequentially outputs the information regarding the shake amount of each of the frames to the division position calculation unit 320. Then, the division position calculation unit 320 sequentially determines the cutout position, the size, and the division position of the processed region based on the information regarding the shake amount input for each of the frames from the shake-amount calculation unit 310 and sequentially outputs the division region information of each of the frames to each of the image processing circuits 401 and 402. Thus, the processing times of the image processing in the image processing circuits 401 and 402 can normally be equal during the photographing period of the imaging device 10.

The case in which the imaging device 10 includes two image processing circuits, i.e., the image processing circuits 401 and 402, and the division position calculation unit 320 in the imaging device 10 determines the division position so that the processed region is divided into two equal region in the horizontal direction has been described. However, the processed region divided by the division position calculation unit 320 in the imaging device 10 is divided so that the processing amounts of the image processing performed by the image processing circuits are equal. Accordingly, as in the above-described example, the prevent invention is not limited to the position at which the processed region is divided by the number of image processing circuits included in the imaging device 10. Here, a case in which processed regions divided by the division position calculation unit 320 are not equal, that is, the sizes of the processed regions allocated to the image processing circuits included in the imaging device 10 are not equal, will be described.

Figure 4A:
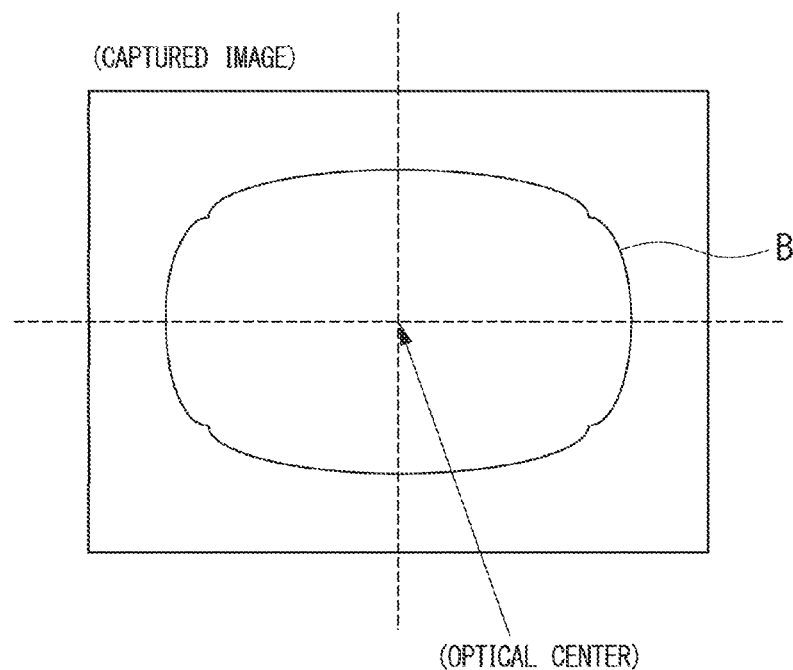
FIGS. 4A and 4B are diagrams schematically illustrating another example of the method of dividing a region to be subjected to the image processing by respective image processing circuits in the imaging device according to the embodiment.
Figure 4B:
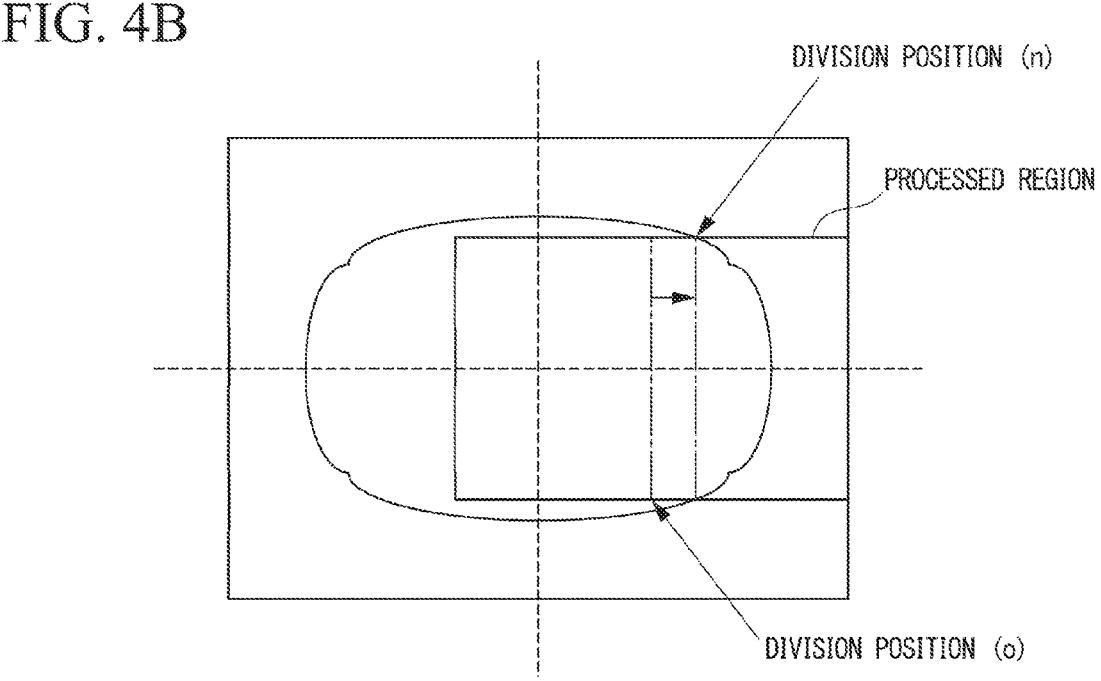

In general, distortion of an optical system is present in an optical system of a camera, that is, a lens included in the imaging device 10. In this case, the captured image of each frame which the imaging processing unit 200 stores (writes) in the memory 600 according to the pixel signal input from the image sensor 100 may become a captured image with the distortion of the optical system caused due to the lens. FIGS. 4A and 4B are diagrams schematically illustrating another example of the method of dividing the region subjected to the image processing by each of the image processing circuits in the imaging device 10 according to the embodiment. FIGS. 4A and 4B illustrate an example of the method of dividing the processed region when barrel-shaped distortion enlarged toward its outer circumference from its optical center is present in a lens included in the imaging device 10.

When the barrel-shaped distortion is present in the lens included in the imaging device 10, the captured image which the imaging processing unit 200 stores (writes) in the memory 600 is an image containing barrel-shaped distortion B, as illustrated in FIG. 4A. In this case, for each of the image processing circuits included in the imaging device 10, a processing amount of image processing to be performed increases to the extent that the captured image to be subjected to the image processing reaches the outer circumference.

Here, a case in which the photography position is moved due to camera shake or the like occurring in the horizontal left direction, as illustrated in FIG. 4B, will be considered. As described above, when the division position calculation unit 320 determines a division position (o) at which the sizes of the processed regions allocated to the image processing circuits 401 and 402 are equal as the division position at which the processed region is divided, the sizes of the captured images within the processed regions corresponding to the image processing circuits 401 and 402 are equal. However, the distortion B is contained only in the processed region to be subjected to the image processing by one of the image processing circuits 401 and 402. Here, for example, the image processing circuit 401 is assumed to perform the image processing on the captured image within the left processed region of the division position (o) illustrated in FIG. 4B and the image processing circuit 402 is assumed to perform the image processing on the captured image within the right processed region of the division position (o) illustrated in FIG. 4B.

In this case, when the image processing circuits 401 and 402 perform the image processing in parallel, the processing amount of the image processing is greater in the image processing circuit 402 that performs the image processing on the right processed region containing the distortion B. Therefore, the processing times of the image processing in the image processing circuits 401 and 402 may be different. More specifically, the processing time of the image processing circuit 402 is greater than the processing time of the image processing circuit 401. This is because when the sizes of photography images obtained as the result of the image processing are equal, more captured images (image data) are required to be processed in a distortion correction process at the time of processing of the outer circumference with greater distortion, in comparison of the outer circumference with greater distortion to a vicinity of the local center with less distortion.

Accordingly, when distortion of an optical system is contained in the processed region to be subjected to the image processing by one of the image processing circuits 401 and 402, the division position calculation unit 320 does not perform the equal division so that the sizes of the processed regions to be divided are equal, but changes the division position according to a ratio of the region with greater distortion contained in the processed region, so that the processing amounts of the image processing to be performed by the image processing circuits 401 and 402 are equal. That is, the division position is determined at a position at which the ratio of the division is unequal according to the ratio of the region with the greater distortion rather than the division ratio of 1:1.

More specifically, as illustrated in FIG. 4B, by moving the division position (o) to a division position (n) moved in the direction of the outer circumference with the greater distortion, the size of the left processed region to be subjected to the image processing by the image processing circuit 401 is enlarged and the size of the right processed region to be subjected to the image processing by the image processing circuit 402 is reduced. Thus, the size of a left processed region of the division position (n) allocated to the image processing circuit 401, as illustrated in FIG. 4B, is unequal to the size of a right processed region of the division position (n) allocated to the image processing circuit 402, as illustrated in FIG. 4B. However, the processing amounts of the image processing performed by the image processing circuits 401 and 402 are equal, and thus the processing times of the image processing in the image processing circuits 401 and 402 are equal.

Also, this concept can similarly apply to, for example, a case in which reel-shaped distortion enlarged toward its outer circumference from its optical center or other distortion of an optical system is present in the lens included in the imaging device 10.

The sizes of the processed regions allocated to the image processing circuits 401 and 402 by the division position calculation unit 320 in the imaging device 10 are set to be unequal not only when the distortion of an optical system occurs, but a position at which the division ratio is unequal is determined as the division position in some cases also due to a photographing posture of the imaging device 10 due to camera shake or the like occurring during photographing performed by the imaging device 10. Here, a case in which the division position calculation unit 320 does not equalize processed regions according to the photographing posture of the imaging device 10 will be described.

In general, movement of the photography position caused due to camera shake or the like during the photographing by a camera is not necessarily only movement in the horizontal direction, the vertical direction, or concurrently in a combination of the horizontal and vertical directions. For example, the photography position is also moved in a depth direction when camera shake or the like occurs in a rotation direction. In this case, a captured image of each frame which the imaging processing unit 200 stores (writes) in the memory 600 according to a pixel signal input from the image sensor 100 may become a captured image with trapezoidal distortion. FIGS. 5A, 5B, 5C, 5D, 5E, and 5F are diagrams schematically illustrating still another example of the region division method by which the image processing circuits in the imaging device 10 according to the embodiment perform the image processing. FIGS. 5A, 5B, 5C, 5D, 5E, and 5F illustrate an example of the method of dividing a processed region when trapezoidal distortion occurs due to movement of a one-side photography position in the depth direction caused by camera shake in a rotation direction of the imaging device 10.

Figure 5A:
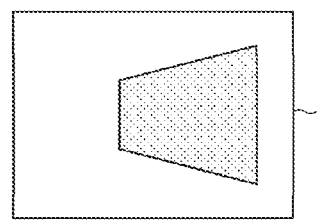
FIGS. 5A, 5B, 5C, 5D, 5E, and 5F are diagrams schematically illustrating still another example of the method of dividing a region to be subjected to the image processing by respective image processing circuits in the imaging device according to the embodiment.
Figure 5B:
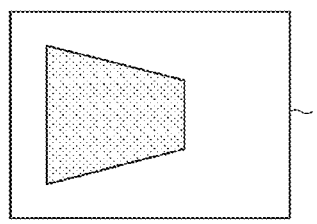
Figure 5C:
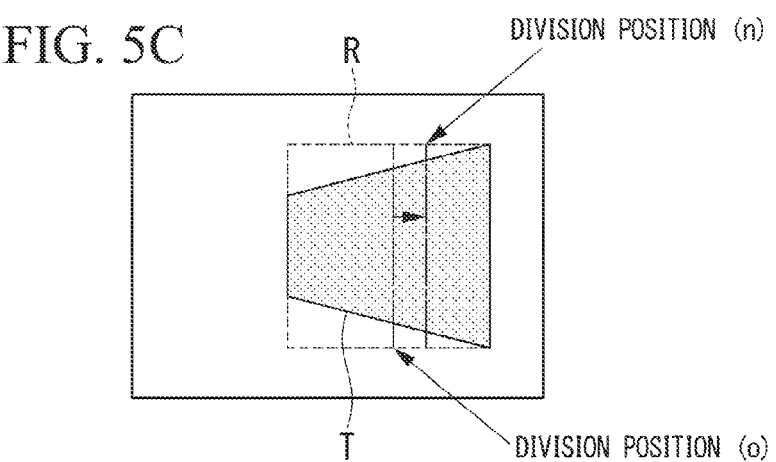

When the camera shake or the like occurs in the rotation direction of the imaging device 10, as illustrated in FIGS. 5A and 5B, an optical image of a subject formed on an imaging surface of the image sensor 100 may contain trapezoidal distortion. When the trapezoidal distortion occurs in the optical image of the subject formed in image sensor 100, a captured image which the imaging processing unit 200 stores (writes) in the memory 600 contains trapezoidal distortion T, as illustrated in FIG. 5C. Thus, the processing amounts of the image processing performed by the image processing circuits included in the imaging device 10 are different according to the sizes of captured images (image data) included within the corresponding processing regions.

Here, a processing amount of the image processing on a region with distortion T caused due to camera shake or the like occurring in a rotation direction, as illustrated in FIG. 5B, will be considered. Since processed regions allocated to the image processing circuits 401 and 402 by the division position calculation unit 320 are rectangular regions, the division position calculation unit 320 determines a division position based on a processed region R illustrated in FIG. 5C. As described above, when the division position calculation unit 320 determines the division position (o) at which the sizes of the processed regions allocated to the image processing circuits 401 and 402 are equal as a division position at which the processed region R is divided, one of the sizes of captured images within the processed region R corresponding to the image processing circuits 401 and 402 is less for one of the image processing circuits 401 and 402. Here, for example, the image processing circuit 401 is assumed to perform the image processing on the captured image within the left processed region R of the division position (o) illustrated in FIG. 5C and the image processing circuit 402 is assumed to perform the image processing on the captured image within the right processed region R of the division position (o) illustrated in FIG. 5C.

In this case, when the image processing circuits 401 and 402 perform the image processing in parallel, the size of the captured image included within the right processed region R including the lower side of the trapezoidal shape of the distortion T is greater than the size of the captured image included within the left processed region R including the upper side of the trapezoidal shape of the distortion T. In other words, the area of the region of the distortion T included within the right processed region R is greater than the area of the region of the distortion T included within the left processed region R. Accordingly, when the sizes of the captured images obtained as the image processing result are the same, the processing time of the image processing may be necessary in the image processing circuit 402 performing the image processing on the right processed region R more than in the image processing circuit 401 performing the image processing on the left processed region R.

Thus, the division position calculation unit 320 does not perform the equal division so that the sizes of the processed regions R to be divided are equal, but changes the division position according to a ratio between the areas of the regions of the distortion T included in the processed regions R, so that the areas of the regions of the distortion T subjected to the image processing by the image processing circuits 401 and 402 are equal, that is, the processing amounts of the image processing performed by the image processing circuits 401 and 402 are equal. That is, a position at which the division ratio is unequal according to the ratio between the areas of the regions of the distortion T rather than the division ratio of 1:1 is determined as the division position.

More specifically, as illustrated in FIG. 5C, by moving the division position (o) to a division position (n) moved in a direction in which the lower side of the trapezoidal shape of the distortion T is included, the size of the left processed region R subjected to the image processing by the image processing circuit 401 is enlarged and the size of the right processed region R subjected to the image processing by the image processing circuit 402 is reduced. Thus, the area of the region of the distortion T included within the left processed region R of the division position (n) allocated to the image processing circuit 401, as illustrated in FIG. 5C, is equal to the area of the region of the distortion T included in the right processed region R of the division position (n) allocated to the image processing circuit 402, as illustrated in FIG. 5C, and thus the processing amounts of the image processing performed by the image processing circuits 401 and 402 are equal. Further, the processing times of the image processing in the image processing circuits 401 and 402 are equal.

Figure 5D:
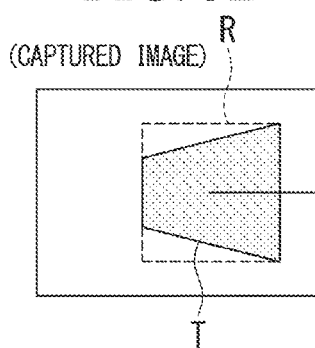
Figure 5E:
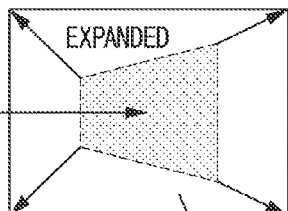
Figure 5F:
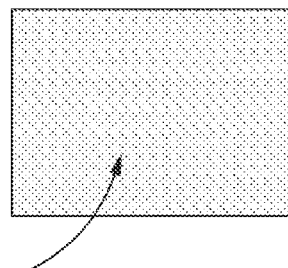
Figure 6A:
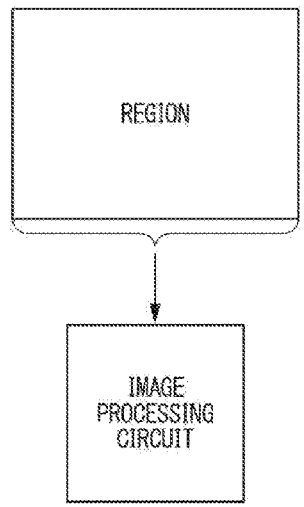
FIGS. 6A, 6B, and 6C are diagrams illustrating an example of a method of shortening the time necessary for image processing in an imaging device according to the related art.
Figure 6B:
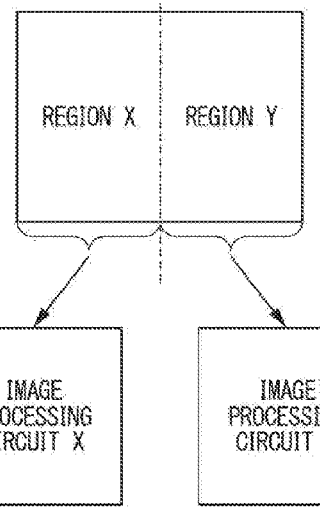
Figure 6C:
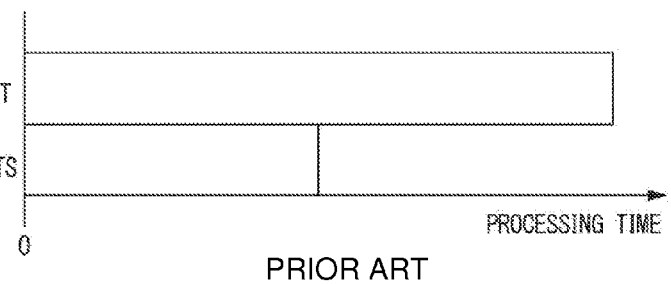
Figure 7A:
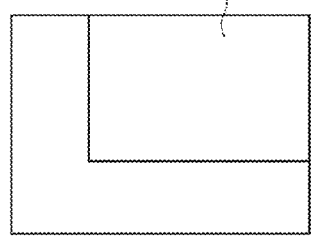
FIGS. 7A, 7B, 7C, 7D, and 7E are diagrams illustrating an example of a relation between a change in a region caused due to camera shake and a time necessary for the image processing in the imaging device according to the related art.
Figure 7B:
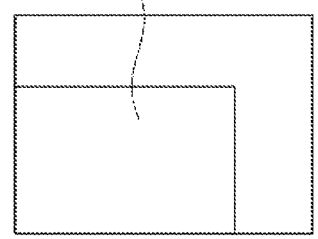
Figure 7C:
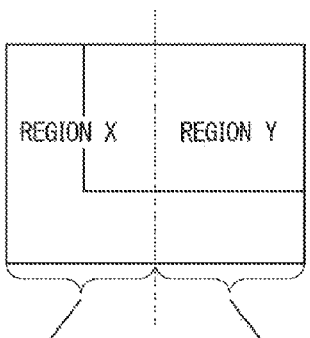
Figure 7D:
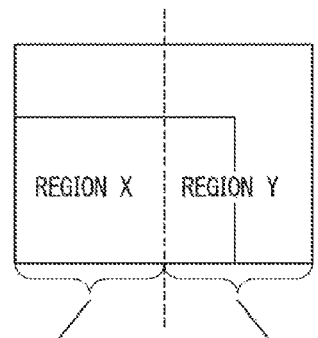
Figure 7E:
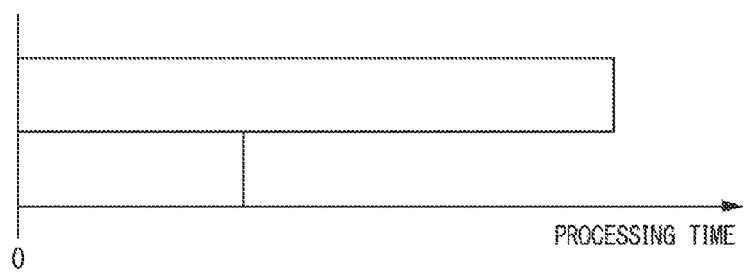

In actual image processing, as illustrated in FIG. 5D, a process of acquiring the captured image within the rectangular processed region R from the captured image included in the region of the trapezoidal distortion T, a resizing process of expanding the acquired captured image within the processed region R, and a process of generating a captured image for which the trapezoidal distortion T is corrected can be considered to be performed as a series of image processing. At this time, in the resizing process of the expansion, the left processed region R including the upper side of the trapezoidal shape in the distortion T is expanded to be larger than the right processed region R including the lower side of the trapezoidal shape in the distortion T. Therefore, in the resizing process, the processing time of the image processing may be necessary in the image processing circuit 401 performing the image processing on the left processed region R more than in the image processing circuit 402 performing the image processing on the right processed region R. That is, a relation between the processing amounts of the image processing performed by the image processing circuits 401 and 402 is a reverse relation to the relation when the division position is determined according to the ratio between the areas of the regions of the distortion T described above. Therefore, the division position calculation unit 320 preferably changes the division position in consideration of the fact that one of the upper side and the lower side of the trapezoidal shape within the processed region R is included in addition to the ratio between the areas of the regions of the distortion T included in the processed regions R, that is, in consideration of the resizing process performed in the series of image processing, so that the processing amounts of the image processing performed by the image processing circuits 401 and 402 are equal.

Also, this concept can similarly apply to, for example, a case in which other distortion is present in an optical image of a subject formed on the imaging surface of the image sensor 100.

As described above, according to the embodiment of the present invention, the imaging device includes a plurality of image processing circuit, and a part is cut out from the entire imaged region of the solid-state imaging device and is divided into processed regions allocated to the image processing circuits so that the processing amounts of the image processing are equal for the processed regions in which captured images of one frame are generated. Thus, in the embodiment of the present invention, the processing times of the image processing performed in parallel by the image processing circuits included in the imaging device can be equal.

According to the embodiment of the present invention, for each frame output by the solid-state imaging device, a part is cut out from the frame and a position at which a processed region is divided to generate the captured images is sequentially determined. Thus, in the embodiment of the present invention, the processing amounts of the image processing can be equal in the processed regions allocated to the image processing circuits, irrespective of the position of the processed region changed for each frame due to camera shake occurring during the photographing by the imaging device or distortion or the like of an optical system in the imaging device. Thus, in the embodiment of the present invention, the throughput from imaging performed by the imaging device to completion of the imaging process performed to generate a photography image can be equal, and thus the advantage of the high speed can be sufficiently obtained compared to an imaging device according to the related art.

In the embodiment, the case in which the imaging device takes a photograph of the moving object is an exemplary example.

However, the image processing performed in parallel by the plurality of image processing circuits included in the imaging device is not limited to the case in which photography images of a moving image described in the embodiment of the present invention are generated. For example, when so-called live view display is performed to display an image used to confirm a subject to be photographed on the display device in an imaging device or a still image is photographed by an imaging device, the concept of the present invention can be applied to a case in which image processing is performed in parallel by a plurality of image processing circuits included in the imaging device.

In the embodiment, the case in which the two image processing circuits 401 and 402 are included and the division position calculation unit 320 determines the division position so that a processed region is divided into two regions in the horizontal direction has been described. However, the number of image processing circuits included in the imaging device and the direction in which the processed region is divided are not limited to the embodiment of the present invention. For example, when two image processing circuits are included in an imaging device, a division position can also be determined so that a processed region is divided into two regions in the vertical direction. Further, for example, when more image processing circuits are included in an imaging device, a division position can be configured to be determined so that the processing amounts of image processing performed by the image processing circuits are equal, by dividing a processed region in a block form in which the processed region is divided in the horizontal direction, the vertical direction, or the horizontal and vertical directions according to the number of image processing circuits included in the imaging device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging device comprising:
    an imaging processing unit including a solid-state imaging device outputting a pixel signal according to incident subject light, and configured to output a captured image according to the pixel signal output by the solid-state imaging device;
    image processing circuits configured to generate a photography image by performing image processing on a corresponding region within a processed region cut out from the captured image output from the imaging processing unit; and
    a division position determination unit configured to detect movement of a photography position at which the solid-state imaging device photographs a subject within a captured region of the solid-state imaging device, to determine the processed region cut out from the captured image according to the photography position after the detected movement in order for the image processing circuits to generate the photography image, and to divide the determined processed region into divided regions and allocates each of the divided regions to one of the image processing circuits, wherein the division position determination unit is configured to determine a division position at which the processed region is divided so that processing amounts of the image processing performed by the image processing circuits are equal to each other, and to output division region information indicating each region in the processed region divided at the determined division position to each of the corresponding image processing circuits, and wherein each of the image processing circuits is configured to generate a photography image of the corresponding region by performing the image processing on the region within the processed region indicated by the corresponding division region information input from the division position determination unit.

2. The imaging device according to claim 1, wherein the division position determination unit is configured to calculate a movement distance or a movement direction of the subject based on the subject contained in the captured image immediately previously output from the imaging processing unit and the subject contained in the current captured image and to detect movement of the photography position based on a calculated movement amount of the subject.

3. The imaging device according to claim 1, wherein the division position determination unit is configured to change the division position at which the processed region is divided so that the processing amounts of the image processing performed by the image processing circuits are equal to each other, including distortion of an optical system contained in the captured image at the time of photography.

4. The imaging device according to claim 1, wherein the division position determination unit is configured to change the division position at which the processed region is divided so that the processing amounts of the image processing performed by the image processing circuits are equal to each other, including distortion according to a posture of the imaging device at the time of photography of the subject.

5. The imaging device according to claim 1, wherein the division position determination unit is configured to detect movement of the photography position based on motion of the imaging device itself detected by a motion detection sensor detecting motion.

6. An imaging method comprising:

outputting a captured image according to a pixel signal output by a solid-state imaging device outputting the pixel signal according to incident subject light;

detecting movement of a photography position by a division position determination unit at which the solid-state imaging device photographs a subject within a captured region of the solid-state imaging device;

determining a processed region cut out from the captured image by the division position determination unit according to the photography position after the detected movement in order for the plurality of image processing circuits to generate a photography image;

dividing the determined processed region into divided regions and allocating each of the divided regions to one of the plurality of image processing circuits by the division position determination unit; and generating the photography image subjected to the image processing by the plurality of corresponding image processing circuits with regard to each of the regions divided from the processed region cut out from the captured image output in the outputting of the captured image, wherein a division position is determined by the division position determination unit at which the processed region is divided so that processing amounts of the image processing performed by the image processing circuits are equal to each other, wherein division region information indicating each region in the processed region divided at the determined division position to each of the corresponding image processing circuits is output by the division position determination unit, and wherein a photography image of the corresponding region is generated by each of the image processing circuits performing the image processing on the region within the processed region indicated by the corresponding division region information input from the division position determination unit.

\* \* \* \* \*